United States Patent
Guillon et al.

(10) Patent No.: US 12,510,416 B2
(45) Date of Patent: Dec. 30, 2025

(54) RECONSTRUCTION OF A WAVEFRONT OF A LIGHT BEAM CONTAINING OPTICAL VORTICES

(71) Applicants: UNIVERSITE PARIS CITÉ, Paris (FR); Centre National De La Recherche Scientifique, Paris (FR); Sorbonne Universite, Paris (FR); Institut National De La Sante Et De La Recherche Medicale, Paris (FR)

(72) Inventors: Marc Guillon, Versailles (FR); Pascal Berto, Paris (FR)

(73) Assignees: UNIVERSITE PARIS CITE, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 443 days.

(21) Appl. No.: 18/019,407

(22) PCT Filed: Jul. 23, 2021

(86) PCT No.: PCT/EP2021/070645
§ 371 (c)(1),
(2) Date: Feb. 2, 2023

(87) PCT Pub. No.: WO2022/028922
PCT Pub. Date: Feb. 10, 2022

(65) Prior Publication Data
US 2023/0296444 A1 Sep. 21, 2023

(30) Foreign Application Priority Data

Aug. 4, 2020 (EP) .................................... 20305898

(51) Int. Cl.
*G01J 9/02* (2006.01)
*G01J 1/42* (2006.01)
*G01J 9/00* (2006.01)

(52) U.S. Cl.
CPC .......... *G01J 9/0215* (2013.01); *G01J 1/4257* (2013.01); *G01J 2009/002* (2013.01)

(58) Field of Classification Search
CPC .. G01J 9/0215; G01J 1/4257; G01J 2009/002; G01J 9/00; G02B 27/09
See application file for complete search history.

(56) References Cited

U.S. PATENT DOCUMENTS

| 2007/0115551 A1* | 5/2007 | Spilman | G02B 27/286 |
| | | | 359/489.03 |
| 2013/0092816 A1* | 4/2013 | Barrett | G01J 9/00 |
| | | | 250/201.9 |
| 2021/0370702 A1* | 12/2021 | Suhara | B41M 5/267 |

FOREIGN PATENT DOCUMENTS

EP 19305382 A1 9/2020

OTHER PUBLICATIONS

International Search Report (ISR) for PCT/EP2021/070645 mailed Oct. 27, 2021 (3 pages).

(Continued)

*Primary Examiner* — Abdullahi Nur
(74) *Attorney, Agent, or Firm* — Jason A. Smith; Shumaker, Loop & Kendrick, LLP

(57) ABSTRACT

A method for reconstructing the wavefront of a light beam by analyzing wavefront-gradient data of said light beam, the light beam containing at least one optical vortex, considering the contribution of the optical vortices to the wavefront. The method including providing a phase-gradient map g of the wavefront of the light beam, generating a Laplacian of a vector potential based on the phase gradient map g, the resulting Laplacian of the vector potential map, called (Continued)

"Laplacian map", exhibiting peaks, the location of each peak corresponding to the location of an optical vortex and the integral of the peak being proportional to a topological charge n of said optical vortex, computing a singular phase map $\varphi_s$ based on the topological charge n and location of each optical vortex, the singular phase $\varphi_s$ map being representative of the contribution of the optical vortex.

18 Claims, 8 Drawing Sheets

(56) References Cited

OTHER PUBLICATIONS

Written Opinion (WO) for PCT/ PCT/EP2021/070645 mailed Oct. 27, 2021 (7 pages).
Abolhasan Mobashery et al. "Detection and characterization of an optical vortex by the branch point potential method: analytical and simulation results" Applied Optics vol. 54, No. 15, May 20, 2015.
FA Starikov et al. "Wavefront Reconstruction of an Optical Vortex by a Hartmann-Shack Sensor", Optics Letters, Optical Society of America, US, vol. 32, No. 16, Aug. 15, 2007.
S. Sprossig "On Helmholtz decompositions and their generalizations—an overview", Mathematical Methods in the Applied Sciences, Jan. 1, 2009. XP 055774235.
Semwal, Ashish, et al. "A Survey: On Image Segmentation and Its Various Techniques." International Research Journal of Engineering and Technology 3.12 (2016): 1565-1568.
Romero-Zaliz, R., and J. F. Reinoso-Gordo. "An updated review on watershed algorithms." Soft computing for sustainability science. Springer, Cham, 2018. 235-258.
L. Huang, M. Idir, C. Zuo, K. Kaznatcheev, L. Zhou, and A. Asundi, "Comparison of two-dimensional integration methods for shape reconstruction from gradient data," Opt. Lasers Eng. 64, 1-11 (2015).
Berto, Pascal, Hervé Rigneault, and Marc Guillon. "Wavefront sensing with a thin diffuser." Optics Letters 42.24 (2017): 5117-5120.).

* cited by examiner

RECONSTRUCTION OF A WAVEFRONT OF A LIGHT BEAM CONTAINING OPTICAL VORTICES

The present invention relates to the reconstruction of a wavefront of a light beam containing at least one optical vortex for laser beam characterization, quantitative phase imaging and other applications.

BACKGROUND

Light radiations not only carry information about their emission sources but also about the properties of the materials they travel across. Due to the high oscillation frequency of light (~$10^{14}$ Hz), conventional detectors are only sensitive to intensity, making direct phase measurements impossible.

However, spatial and spectral phase information is crucial for applications where in-situ, nanometric-sensitivity, non-contact phase sensing is required:

In metrology, for the development, alignment, characterization and quality control of complex optics, optical systems and sources such as high-end lasers, free-form optics may exhibit complex shapes with strong curvatures typically yielding optical vortices in the propagated optical field.

In adaptive optics, for the measurement of the aberrations of an optical system, including the atmosphere, biological samples, multimode and multicore optical fibers, to pre-compensate them and improve the optical resolution when imaging behind this system, i.e. stars or biological/biomedical samples. Noteworthy, multi-mode optical fibers and multi-core fiber bundles are currently extensively studied for minimally-invasive micro-endoscopy for biomedical applications. An illustration of the performances of adaptive optics without and with considering optical vortices is shown in FIG. 1. The first column C1 in FIG. 1 displays phase aberrations at the pupil plane, where aberrations may be conveniently compensated, together with the resulting intensity distribution at the focal plane of an imaging lens. The second column C2 corresponds to the case where only the regular part of the phase is compensated but where optical vortices are ignored, and the third column C3 illustrates the case of fully compensating phase aberrations. As illustrated in FIG. 1, when only compensating the regular part of the phase but ignoring optical vortices, the intensity increase at the focus is much less and the beam profile is much less sharp. By contrast, when fully compensating phase aberrations, a perfect focus is restored.

In imaging, to enable a non-invasive quantitative characterization of transparent samples such as biological specimens. Quantitative phase imaging (QPI) of biological samples also gives access to their local dry mass and, as such, can monitor their metabolism and perform functional imaging and neuronal activity detection. QPI was also recently used to image refractive index distributions in special optics, e.g. fibers, structured glass. Optical vortices may appear when imaging vortex-free phase objects, because of phase noise in low-intensity regions. However, in this case, vortex reconstruction remains critically important for structure recognition as evidenced in FIG. 2. The example of FIG. 2 displays the case of a phase image altered with optical vortices (left). As illustrated, when removing phase vortices, such as typically achieved in usual phase reconstruction techniques used with WFS, the portrait is not recognizable (right). Similarly, for other phase-imaging, optical vortex reconstruction is thus important to allow a proper interpretation. Finally, optical diffractive tomography is typically achieved in the far field where optical vortices always appear whatever the imaged object. Three-dimensional object reconstruction by tomography demands reconstruction of phase vortices.

In telecommunications, to provide simple detection of multiplexed information channels encoded in different optical modes. Both in air and through multi-mode optical fibers, it is possible to increase the rate of data transmission by multiplexing information in different modal channels such as optical vortex beams. In this case, the difference between the different modes are in the phase structure of the beam and modal discrimination demands a phase measurement.

Among the few techniques able to retrieve optical phase, Wavefront Sensor, referred to as WFS in the following, has many advantages as compared to digital holography, in particular when the wavefront distortion is smooth. It is simpler to implement, does not require laser illumination prone to random interference, and is less sensitive to vibrations and air convection.

Shack-Hartmann WFS (SH-WFS) and lateral shearing interferometry (LSI) are the most common WFS techniques. Both are based on a phase encoding element, a microlens array and a grid phase-mask respectively, placed before a camera, which creates a grid of spots distorted by gradients in the incident WF.

In addition, the Applicants recently proposed, in EP 19305382, a simple, low-cost, and original implementation of high-resolution WFS (~20 kpx, recently extended to ~70 kpx), taking advantage of the memory effect of thin diffusers.

In its principle, a WFS only measures a phase gradient map and not directly the phase of the beam. The phase is retrieved from the phase gradient map by a numerical integration step.

The recent advances in the development of high-resolution WFS, as well as in the domain of spatial phase modulators makes it relevant to not only measure simple and smooth wavefronts, but also complex wavefronts originating from scattering media or just from out-of-focus smooth samples. Complex wavefronts, intrinsically contain so-called optical vortices. Such optical vortices are characterized by phase singularities.

The numerical integration step is especially difficult in the presence of optical vortices for two main reasons: —first because of phase-gradient goes to infinity in the close vicinity of the vortex centers and—second, because optical vortices are associated with non-conservative phase-gradient vector fields. In the presence of an optical vortex, the phase gradient map measured by a WFS is then defined over a multiply connected domain. Hence, direct spatial two-dimensional integration to retrieve the phase becomes difficult. In this case, integration indeed depends on the line-path, due to the non-conservative properties of the vector field. This difficulty arises because of the intrinsic periodic nature of the singularity phase making 0-phase equal to $2\pi$-phase and so seemingly leading to reconstruction ambiguities. Integration of an azimuthal vector field would indeed result in a paradoxical ever-increasing or ever-decreasing spiral Penrose staircase.

The problem of phase singularities integration has reported since the early ages of adaptive optics in astronomy. Neglecting branch cuts has been shown to significantly degrade the performances of adaptive-optics. Although optical vortices are detected by WFS, the problem of the full phase-gradient-map integration provided by WFS has only been achieved in simple cases using complicated pixel-based reconstruction algorithms.

It is desirable to have a systematic and robust method that obviates all or part of the above-mentioned drawbacks and that makes it possible to reconstruct the full phase pattern of complex wave-fields by WFS.

SUMMARY OF THE INVENTION

Exemplary embodiments of the invention aim at fulfilling this need and relate to a method for analyzing the wavefront-gradient data of a light beam, notably measured using a wavefront sensor, the light beam containing at least one optical vortex, in order to estimate the contribution of the optical vortices to the wavefront, the method comprising:
  a) providing a phase-gradient map g of the wavefront of the light beam,
  b) generating a Laplacian of a vector potential based on the phase gradient map g, the resulting Laplacian of the vector potential map, called "Laplacian map", exhibiting peaks, the location of each peak corresponding to the location of an optical vortex and the integral of the peak being proportional to a topological charge n of said optical vortex,
  c) for at least one of these peaks:
  i) determining the location of each peak on the Laplacian map to locate the corresponding optical vortex,
  ii) computing an approximate value of the integral of each peak in the Laplacian map to evaluate each topological charge n of each corresponding optical vortex,
  d) computing a singular phase map $\varphi_s$ based on the topological charge n and location of each optical vortex computed in steps i) and ii), the singular phase p map being representative of the contribution of the optical vortex.

Step i) may be carried out before step ii), or after step ii), or simultaneously with step ii).

The invention enables to identify the location and the charge of optical vortices present in a wavefront. Hence, the invention yields the singular phase—the phase-contribution containing optical vortices—and makes it possible to consider the contribution of the optical vortices.

Through the computation of the singular phase, it becomes possible to account for the contribution of the vortices in subsequent calculations. This allows to avoid mistakes commonly encountered when vortices are neglected or inaccurately characterized, as demonstrated in FIG. 1 or 2.

Moreover, together with the ability to retrieve the regular phase such as achieved by any one of current techniques, the invention enables to reconstruct the complete wavefront thanks to the identification of optical vortices.

The invention has applications in many fields for which the knowledge of the singular phase is beneficial. These applications include optical metrology, bio-imaging, adaptive optics; ophthalmology, telecommunications, optical diffractive tomography, or inter alia.

The term "Wavefront Sensor (WFS)" refers to a device for measuring the wavefront shape of a light beam, notably its curvature as compared to a planar wavefront. The output of a wavefront sensor is a vector field accounting for the two dimensional gradient map of the wavefront of the light beam.

The WFS may comprise a phase or intensity mask placed before an intensity detector, for example a camera.

The WFS may be a Shack-Hartmann WFS (SH-WFS), comprising an array of microlenses arranged in front of the intensity detector.

The WFS may be a lateral shearing interferometry (LSI) comprising a grid phase-mask in front of the intensity detector.

Alternatively, the WFS comprises a diffuser placed before the intensity detector.

Such a WFS is described in EP 19305382.

A "Helmholtz Decomposition" refers to a decomposition of a vector field using Helmholtz theorem. According to Helmholtz theorem, any arbitrary vector field can be decomposed into a solenoidal field and a conservative field.

Helmholtz decomposition may thus be used to decompose a given vector field into a curl-free component and a divergence-free component.

A more complete description of Helmholtz decomposition can be found, for instance, in (Sprössig, W. "On Helmholtz decompositions and their generalizations—an overview." Mathematical methods in the applied sciences 33.4 (2010): 374-383.) and in references cited therein.

According to the Helmholtz decomposition, the phase gradient map g may be written as: $g=\nabla\varphi_r+\nabla\times A$
  where $\varphi_r$ is the regular phase and A a potential vector, the second term $\nabla\times A$ corresponding to the solenoidal term.

Preferably, the Laplacian map in step b) refers to the Laplacian operator applied to the potential vector A, which may be expressed in cartesian coordinates as $$\Delta A = \frac{\partial A}{\partial x} + \frac{\partial A}{\partial y} + \frac{\partial A}{\partial z}.$$

In principle, as A is a three-dimensional vector, its definition may not be univoqual. A Gauge is preferably arbitrarily chosen to ensure a unique solution.

In a preferred embodiment, in step b), the Laplacian map is obtained by:
  considering that the potential A only contain an axial contribution, perpendicular to the WFS plane: $A=A_z e_z$, where $e_z$ is the unit vector along an axial direction and where the potential A satisfies the Coulomb gauge $\nabla \cdot A=0$,
  generating the Laplacian map by applying a curl operator to the phase-gradient map g.

"An optical vortex" refers to a helical phase ramp accompanied by null intensity and a singularity phase at the vortex point. A topological charge of the optical vortex is a measure of its helicity.

By definition of the topological charge n, the integral of g over a close contour C surrounding the vortex is $\oint_C g \cdot dl = 2\pi n$. The magnitude of the topological charge n determines the number of cycles of $2\pi$ phase change in one revolution around the vortex point and its sign provides information relative to the direction of phase circulation, clockwise or counterclockwise, of the vortex. For a freely propagating light-beam, the topological charge is usually an integer, especially in random wavefields. Alternatively, the topological charge may also be a fraction of unity (1/k, with k an integer) or any multiple of this fraction.

In virtue of the Stokes theorem, the topological charge n of a vortex is also closely related to the integral of the Laplacian of the vector potential A:

$$n = \oint_C g \cdot d\ell = \int\int_S -\frac{\Delta A_z}{2\pi} dS$$

where the integration of $\Delta A_z$ is performed over the surface S enclosed in the contour C surrounding the optical vortex. In step ii), the topological charge n of the vortex may thus be measured by computing the integral of the peaks of the Laplacian map.

In some embodiments, in step ii) the topological charge n of an optical vortex may be obtained by:
  dividing the approximate value of the integral of the corresponding peak by $2k\pi$, with k an integer, and
  rounding the result of the former operation to the closest integer to get the topological charge n.
  The topological charge n is then equal to this integer divided by k. The integer k may be equal to −1 or +1.

Image Processing

The method may comprise prior to step c), applying an image processing method to the Laplacian map to extract the location and the charge of optical vortices.

In some embodiments, the image processing method may comprise a segmentation of the Laplacian map into a plurality of segments to obtain a segmented Laplacian map, segments being determined so that different peaks of the Laplacian map belong to different segments.

The term "segmentation" refers to the partition of the Laplacian map into a set of non-overlapping regions, called segments, that cover it. Examples of suited segmentation techniques are described in (Semwal, Ashish, et al. "A SURVEY: On Image Segmentation And Its Various Techniques." International Research Journal of Engineering and Technology 3.12 (2016): 1565-1568.).

For example, the segmentation may be realized with a numerical tool among the list: watershed algorithm, normalized cut algorithm, SLIC algorithm, or convolutional neural networks, and/or a deep learning algorithm.

Preferably, the segmentation is performed using a watershed algorithm. A description of some watershed algorithms can be found in (Romero-Zaliz, R., and J, F, Reinoso-Gordo. "An updated review on watershed algorithms." Soft computing for sustainability science. Springer, Cham, 2018. 235-258.).

The Laplacian map being segmented, step i) may comprise computing the weighted centroid of each peak in each segment corresponding to said peak, determining the location of the said peak based on the weighted centroid.

In step ii), the approximate value of the integral of each peak may be determined by computing the integral over the corresponding segment of the segmented Laplacian map. The topological charge n of the corresponding vortex may be then determined based on the approximate value of the integral of the said peak.

In an alternative embodiment, the image processing method may comprise fitting the peaks with bell-shaped functions, for example with Gaussian functions, in which case the segmentation method may be unnecessary.

Step i) may then comprises computing the center of the bell-shaped functions and determining the location of the corresponding peaks based on the center of the bell-shaped functions.

In step ii), the integral of the peak may be estimated by computing the area under the corresponding fitting bell-shaped curve. The topological charge n of the corresponding vortex may then be determined based on the approximate value of the integral of said peak According to another embodiment, the image processing method may comprise solving an inverse problem to estimate the distribution of the peaks, by using tools such as a compressed sensing algorithm, a Markov Chain Monte Carlo Algorithm (MCMC) methods or neural networks.

The image processing method may comprise identifying the extrema values of the Laplacian, notably using a threshold to ignore noise, wherein in step i) the location of the peaks is determined based on the location of the extrema.

In step ii) the integral of the peaks may be determined from the extrema magnitude only. For example, considering a peak with a known width "w". This width may for instance be known from prior characterization or be estimated by other means. Assuming the width w to be constant, the integral of the peak is then equal to $Aw^2$, up to a multiplicative factor.

Wavefront Reconstruction

Singular Phase Map

In step d) the singular phase map $\varphi_s$ may be computed by:
  iii) generating a vortex-location map, where map values are equal to the corresponding topological charges of optical vortices at optical vortices locations, notably with a one-pixel precision, and
  iv) convoluting said vortex-location map with a single +1 spiral phase profile.

Advantageously, when more than one peak is detected, the singular phase $\varphi_s$ may be obtained by adding as many spiral phase profiles as the number of detected optical vortices, each spiral phase profile being centered at the same location and having the same topological charge as the detected optical vortices. In this case, the vortex location may not need to be rounded to the nearest pixel resulting in a more precise singular phase pattern.

Regular Phase Map

According to some embodiments, the method may comprise a step e) consisting in reconstructing the wavefront of the light beam with:
  computing a regular phase $\varphi_r$ map of the light beam, the regular phase corresponding to a vortex-free phase computed from the irrotational component in the Helmholtz decomposition described above.
  adding the regular phase $\varphi_r$ to the singular phase $\varphi_s$.

In step e), the regular phase $\varphi_r$ map may be computed by applying a divergence operator to the phase gradient map g, followed by a double spatial integration. A typical description of state-of-the-art integration techniques may be found in L. Huang, M. Idir, C. Zuo, K. Kaznatcheev, L. Zhou, and A. Asundi, "Comparison of two-dimensional integration methods for shape reconstruction from gradient data," Opt. Lasers Eng. 64, 1-11 (2015).

The invention also relates to a computer-readable storage medium comprising instructions which, when executed by a computer, causes the computer to carry out the steps of the method according to the invention.

An additional aspect of the invention includes a device for analyzing a wavefront of a light beam containing at least one optical vortex comprising:
  a wavefront sensor to measure the phase-gradient of the wavefront of the light beam;
  coupled to the wavefront sensor, means for carrying out the steps of the method according to the invention, some calculating means comprising a memory storage unit, a set of instructions and a processor for executing said set of instructions, such as a PC computer or a dedicated micro-controller.

The device may be configured to reconstruct the wavefront of the light beam, by calculating the regular phase $\varphi_R$ which is added to the singular phase $\varphi_s$.

According to some embodiments, the calculating means may be configured to:
  pre-compensate the aberrations or
  compensate a posteriori the aberrations, of the wavefront of the light beam which result from the emission sources and of and from the properties of the materials the light beam travels across.

The wavefront sensor may be chosen among the list:
Shack-Hartmann wavefront sensor
Multi-wave interferometer such as Quadri-wave lateral shearing interferometer
Pyramid Wavefront sensor.

BRIEF DESCRIPTION OF THE DRAWINGS

The accompanying drawings, which are incorporated in and constitute a part of the specification, illustrate presently preferred embodiments of the invention, and together with the description, serve to explain the principles of the invention. In the drawings.

DETAILED DESCRIPTION

Whenever possible, the same reference numbers will be used throughout the drawings to refer to the same or like parts.

In accordance with the invention, and as broadly embodied, a method according to the present invention is provided, aiming at analyzing a wavefront of a light beam 15 containing at least one optical vortex V to estimate the contribution of the optical vortices to the wavefront.

First, at step 101, a phase-gradient map g of the wavefront of the light beam 15 is provided. This phase-gradient map g may be generated using a WFS 50.

For example, the WFS 50 may be a Shack-Hartmann WFS, a Multi-wave interferometer such as Quadri-wave lateral shearing interferometer, or a Pyramid WFS.

Alternatively, the WFS 50 comprising a diffuser may be used. Such a WFS is described in EP 19305382 and in (Berto, Pascal, Hervé Rigneault, and Marc Guillon. "*Wavefront sensing with a thin diffuser.*" Optics Letters 42.24 (2017): 5117-5120.).

Then at step 107, a Laplacian of a vector potential based on the phase gradient map g is generated.

Figure 4:
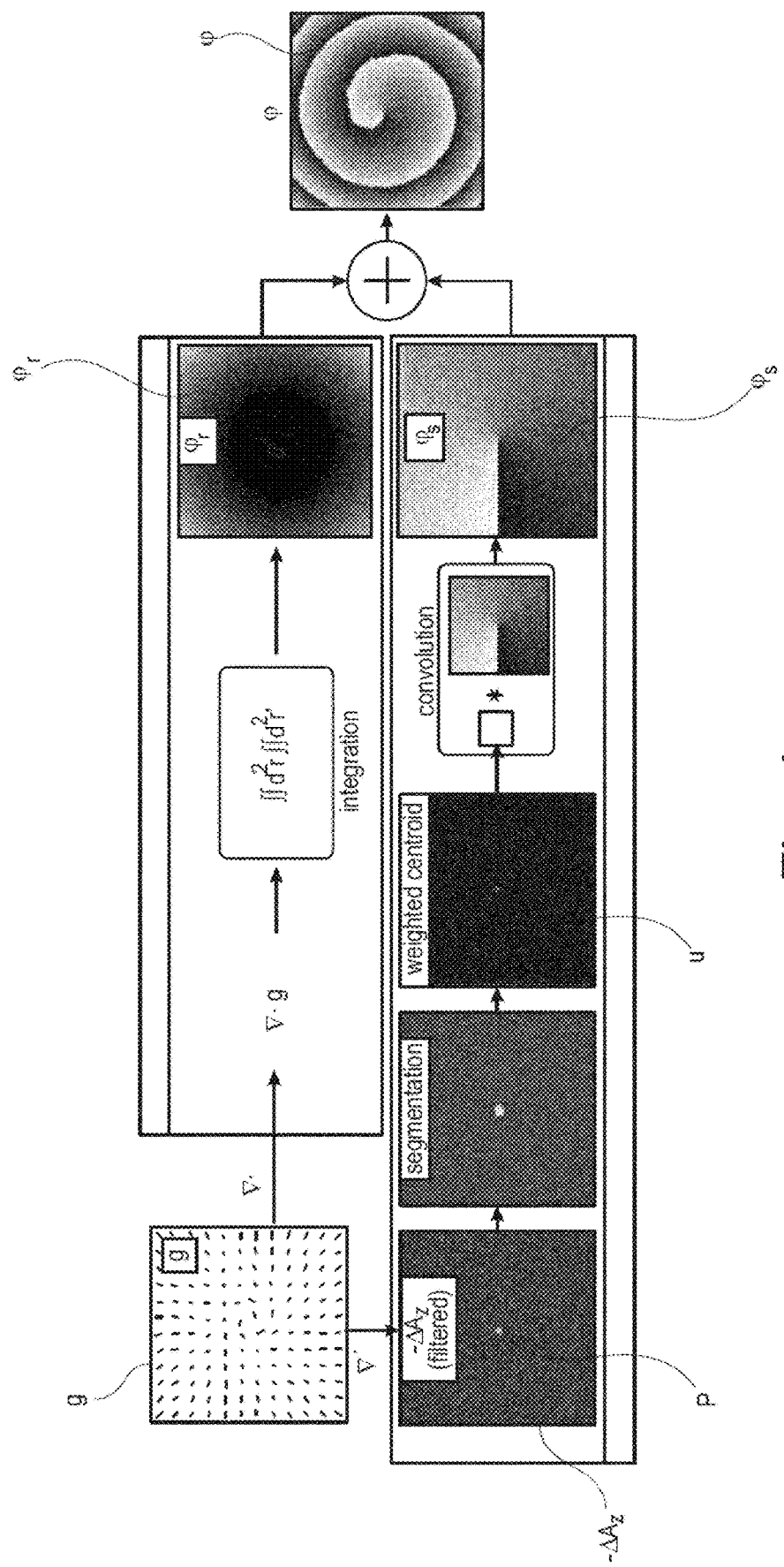

To generate the Laplacian map, the method may comprise prior to step 107, a step 103 consisting in performing a Helmholtz decomposition of the phase-gradient map g to split it into an irrotational component and a solenoidal component, as illustrated in FIG. 4.

According to Helmholtz decomposition, the phase-gradient g may be expressed as follows: $g=\nabla\varphi_r+\nabla\times A$ where $\varphi r$ is the regular phase, the gradient $\nabla\varphi r$ corresponding to the irrotational component and A is the potential vector resulting in the solenoidal contribution.

In order to characterize the solenoidal contribution, the method may comprise at step 105 applying a curl operator to the phase-gradient map g. The curl of the phase-gradient map g is given by the following equation: $\nabla\times g=\nabla(\nabla\cdot A)-\Delta A$.

In the following, a Coulomb gauge is used requiring $\nabla\cdot A=0$. However, the method can be generalized to any other choice of gauge. Using the Coulomb gauge yields $\nabla\times g=-\Delta A$.

Since g is a two-dimensional vector field, in say a x-y plane, the potential A may be written as $A=A_z e_z$, where $e_z$ is an unit vector perpendicular to the x-y plane.

Hence, applying the curl operator to the phase map g yields obtaining the Laplacian map $-\Delta A_z$.

Figure 5A:
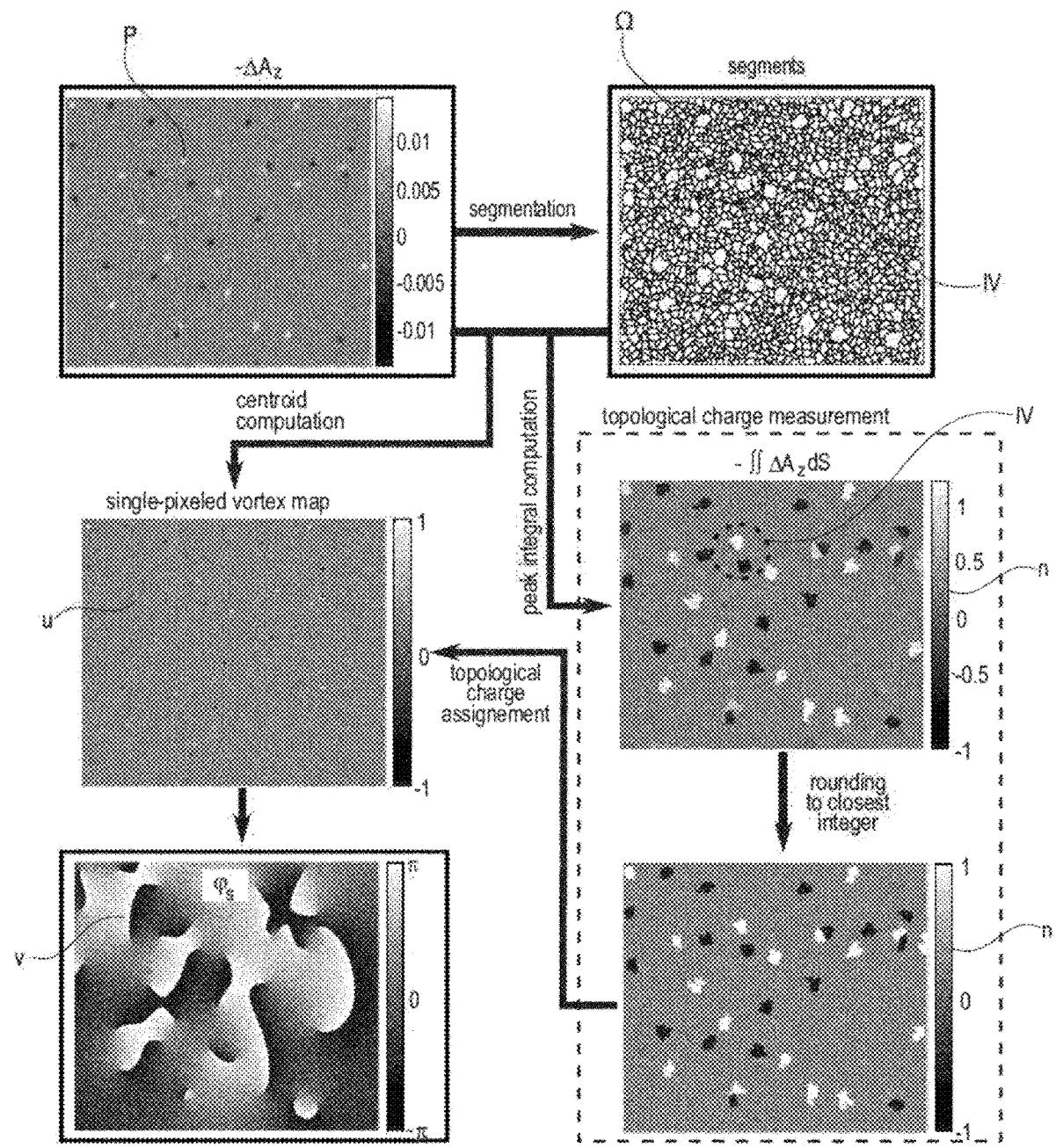
FIG. 5a is a schematic of one embodiment of a method according to the invention.
Figure 5B:
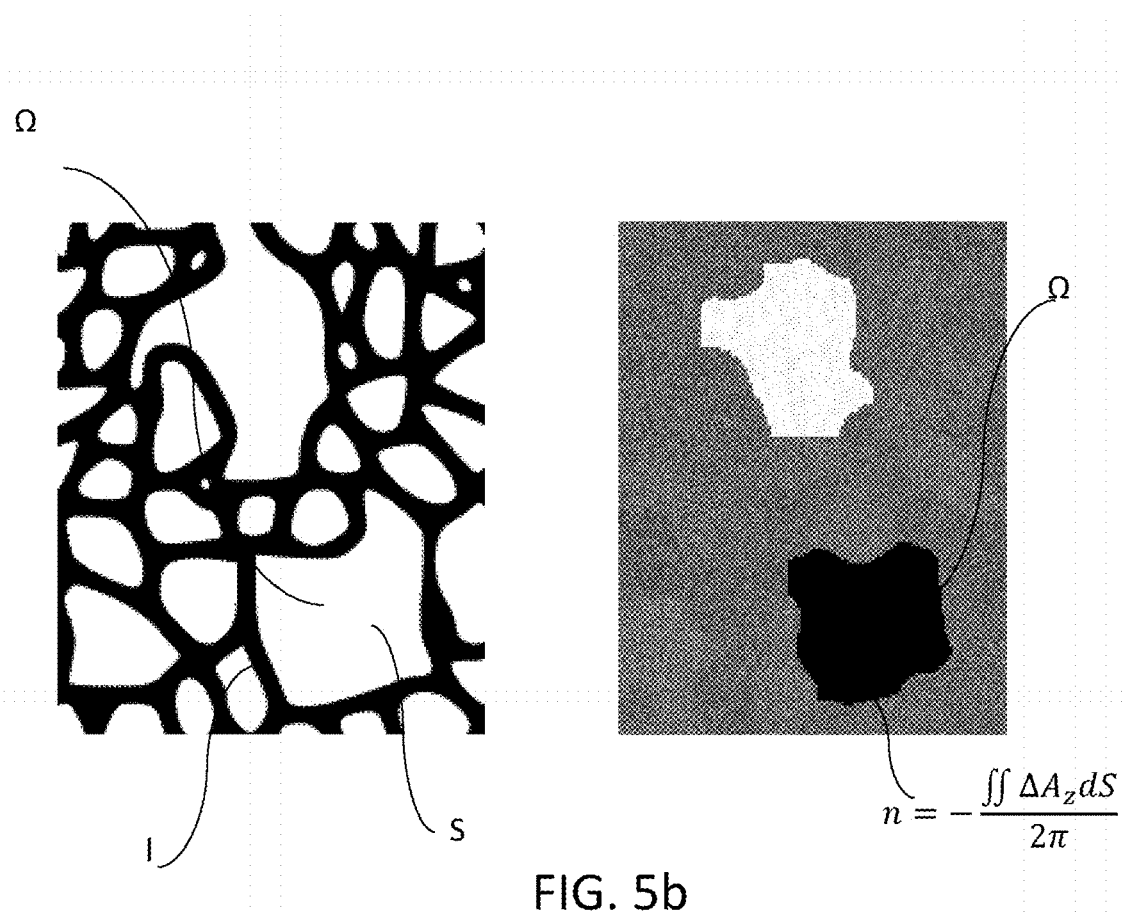
FIG. 5b shows detail IV of FIG. 5b, FIGS. 6a, 6b, 7a, 7b, 7c, and 7d show examples of reconstruction of the shapes of the wavefront using a method according to the invention.

Examples of Laplacian maps $-\Delta A_z$ are shown in FIGS. 4, 5a and 5b. In the illustrated embodiments, the Laplacian map $-\Delta A_z$ exhibits peaks P related to optical vortices. In the illustrated embodiments, the peaks—which are considered—correspond to the useful signal. Peaks due to noise are not taken into account.

The location of each peak P corresponds to the location u of an optical vortex.

The integral of the peak being proportional to a topological charge n of said optical vortex.

After determining the Laplacian map $-\Delta A_z$, the next steps 111 and 113 consist in calculating the location of the peaks P on the Laplacian map $-\Delta A_z$ and in computing an approximate value of the integral of each peak in the Laplacian map, respectively.

In step 113, one may use the location of the peaks P on the Laplacian map $-\Delta A_z$ to locate the corresponding optical vortex.

In step 115, based on Stokes theorem, the approximate value of the integral of each peak in the Laplacian map makes it possible to evaluate each topological charge n of each corresponding optical vortex.

On the one hand, the integral of g over a close contour 1 surrounding the vortex is $\oint g \cdot dl = 2\pi n$.

On the other hand, according to Stokes theorem, the integral of $\oint g \cdot dl$ is equal to the surface integral of its curl $\iint \nabla\times g \cdot dS$, S being the surface enclosed by the close contour 1.

Figure 6B:
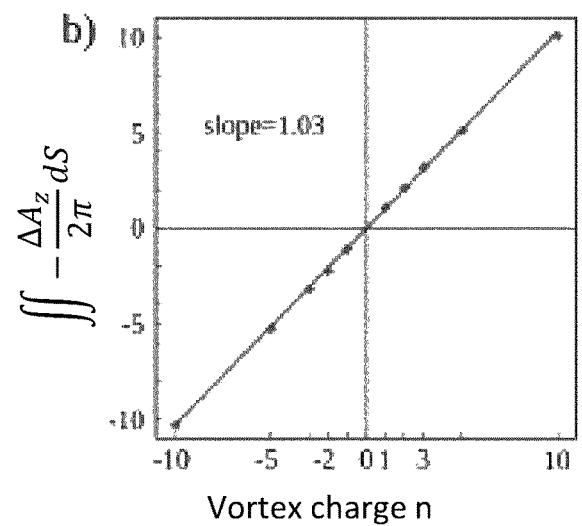

As mentioned above, the curl of the phase gradient map $\nabla\times g$ is equal to the Laplacian map. Therefore, the value of the integral of each peak in the Laplacian map $\iint -\Delta A_z \cdot dS$ advantageously evaluates the topological charge n of the corresponding optical vortex. More precisely, and as shown in FIG. 6b, when calculating the approximate value of the integral, the topological charge n of an optical vortex may be obtained by dividing the approximate value of the integral of the corresponding peak by $2k\pi$, with k an integer being, in general, equal to −1 or +1. The sign of the integer k provides information relative to the direction of phase circulation, clockwise or counterclockwise, of the vortex.

It is worth mentioning that in the method according to the invention, the estimation of the vortex charge through the integration of $-\Delta A_z/2k\pi$ is not or very slightly affected by the limited resolution of the wavefront sensor or by the diverging phase gradient magnitude in the vicinity of the vortex. This is mainly related to the use of the Stokes theorem for computing the topological charges. Since at large-enough distances from the vortex location, the phase-gradient estimate is accurate, the contour integration at this distance yields the correct charge value. Therefore, in virtue of the equivalence ensured by the Stokes theorem, surface integration of $-\Delta A_z/(2k\pi)$ over the surface enclosed by this close contour yields the same accurate charge value.

In the embodiment of FIG. 5a, the surface integral of $-\Delta A_z/(2k\pi)$ is rounded to the closest integer to get the topological charge n of the corresponding optical vortex.

In some applications, the Laplacian can be affected by noise and/or by filtering caused by the WFS, notably by a transfer function of the WFS. In this case, it is preferable to apply an image processing method to the Laplacian map to extract the location and the charge of optical vortices from the computed Laplacian map $-\Delta A_z$.

In this case, the method may comprise an additional step 109 preceding step 111, consisting in applying the image processing method to the Laplacian map $-\Delta A_z$.

In the embodiments of FIGS. 4, 5a and 5b, the image processing method comprises a segmentation of the Laplacian map $-\Delta A_z$ into a plurality of segments 2 to obtain a segmented Laplacian map.

Advantageously, segments 2 are determined so that different peaks P of the Laplacian map belong to different segments.

In the illustrated embodiments of FIGS. 4, 5a and 5b, the segmentation is performed using a watershed algorithm.

Other segmentation algorithms may be used, for example, normalized cut algorithm, SLIC algorithm, convolutional neural networks and deep learning algorithm.

Once the Laplacian map $-\Delta A_z$ is segmented, peaks locations u are then calculated in step 111.

For this purpose, step 111 comprises first computing the weighted centroid of each peak P in each segment $\Omega$ corresponding to said peak P, and second determining the location u of the said peak P based on the weighted centroid, as illustrated in FIGS. 4 and 5a.

As shown in FIGS. 4, 5a and 5b, in step 113, the approximate value of the integral of each peak P is determined by computing the surface integral of the Laplacian $-\Delta A_z$ over the corresponding segment.

The topological charge n of the corresponding vortex V may then be determined in a same way as described above.

At step 115, the singular phase map $\varphi_s$ is calculated based on the topological charge n and location u of each optical vortex V computed in steps 111 and 113.

As embodied in FIGS. 4 and 5a, the singular phase map $\varphi_s$ may be computed by:
iii) generating a vortex-location map, where map values are equal to the corresponding topological charges of optical vortices at optical vortices locations, and
iv) convoluting said vortex-location map with a single +1 spiral phase profile.

FIG. 5a relates to the case where a plurality of peaks P is detected.

In this case, the singular phase $\varphi_s$ is advantageously obtained by adding as many spiral phase profiles as the number of detected optical vortices, each spiral phase profile being centered at the same location and having the same topological charge as the corresponding detected optical vortex.

The method may comprise as shown in FIG. 4, a step 121 consisting in computing the regular phase $\varphi_r$ map of the light beam. As mentioned above, the regular phase corresponds to the vortex-free phase computed from the irrotational component.

To that end, a divergence operator may be applied to the phase gradient map g at step 117, followed by a double spatial integration at step 119. The regular phase is then obtained at step 121.

A suitable method to compute the regular phase may be found in (L. Huang, M. Idir, C. Zuo, K. Kaznatcheev, L. Zhou, and A. Asundi, Opt. Lasers Eng. 64, 1 (2015).)

At step 123, the regular phase may be added to the singular phase $\varphi_s$ to reconstruct the wavefront of the light beam with adding the regular phase $\varphi_R$, as embodied in FIG. 4.

Figure 6A:
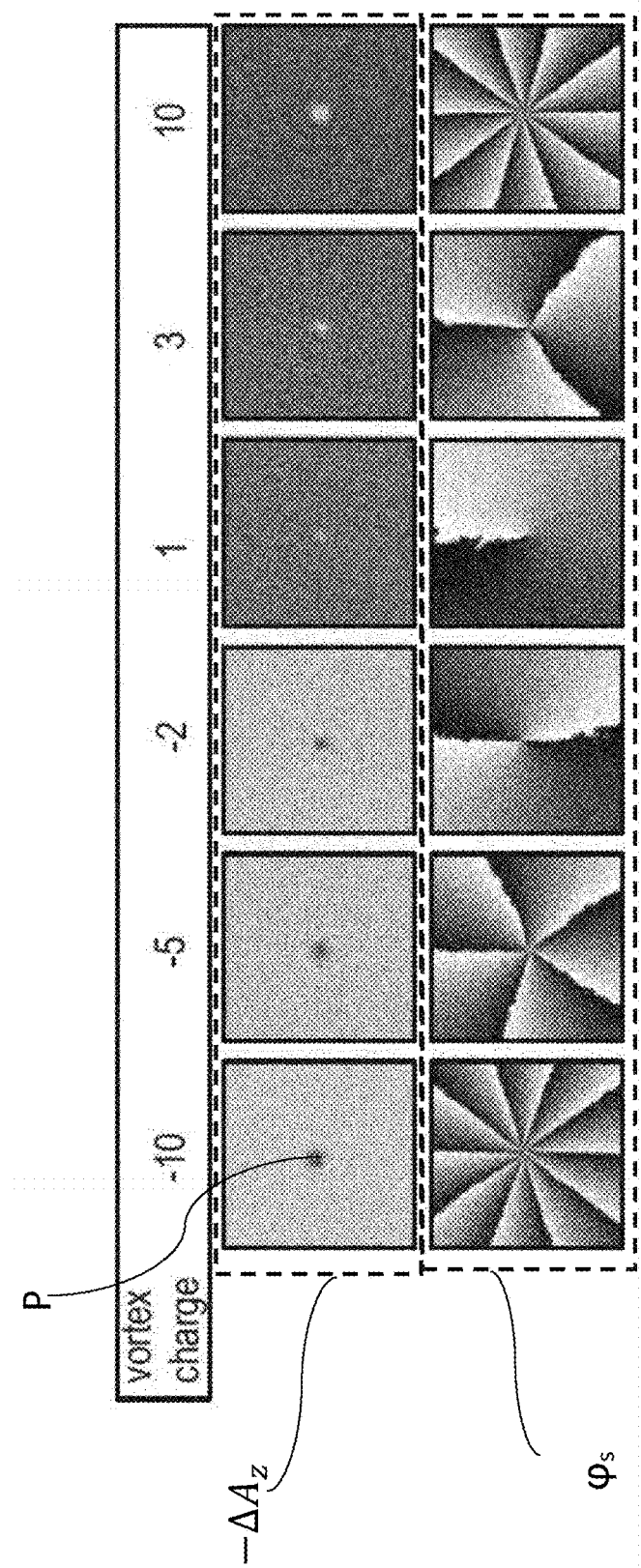

FIGS. 6A and 6B illustrate the possibility to rebuild optical vortices of charges larger than 1. The first line represents the Laplacian map and the second line the wavefront. In the example illustrated herein, the value of the topological charge n varies from −10 to +10. This is of typical interest for information multiplexing in telecommunications through air or optical fibers. One specific difficulty in this case is the increasing gradient at the vortex location, leading to an increased filtering by the optical transfer function of the WFS. As a consequence, the $-\Delta A_z$ maps exhibit peaks P whose width increases with the charge of the vortex n, as shown in line 1.

As can be seen in FIGS. 6B, despite those difficulties, the integration of $-\Delta A_z/(2\pi)$ over segmented regions yields the topological charge n with a 3% accuracy. This slight discrepancy can be attributed to the calibration uncertainties of the WFS 50 and of the spatial light modulator 40 used for generating the vortices, and can be dealt with by rounding the integrated value to the closest integer.

Figure 7A:
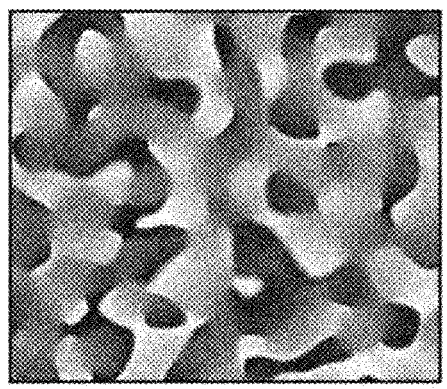

FIGS. 7A to 7D illustrate the possibility to retrieve the phase of complex random wavefields which is of special interest for imaging in depth through or inside scattering media like biological tissues. FIG. 7A displays a random wavefield exhibiting a high density of optical vortices of charge +1 and −1. These vortices exhibit elliptical phase-increase and intensity profiles along the azimuthal coordinate which may alter the ability to detect them.

Figure 7B:
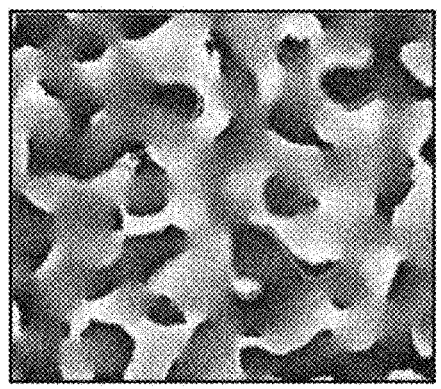
Figure 7C:
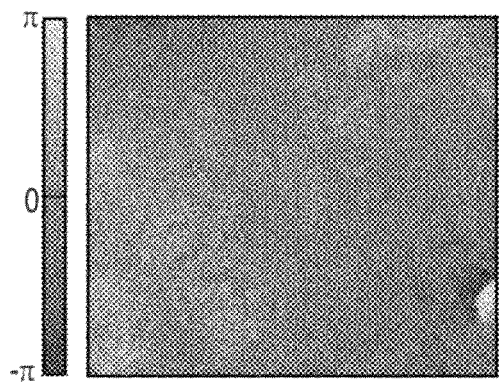

Furthermore, as can be seen in FIG. 7A, the separation distances between the vortices may be much smaller than a speckle grain size, especially when close to creation or annihilation events of pairs of vortices. Despite these specific additional difficulties, FIG. 7B shows that such a complex wavefield can be efficiently rebuilt using the Laplacian map displayed in FIG. 7D. The difference between the rebuilt and the actual phase profiles is shown in FIG. 7C demonstrating the almost perfect identification of optical vortices.

Figure 8A:
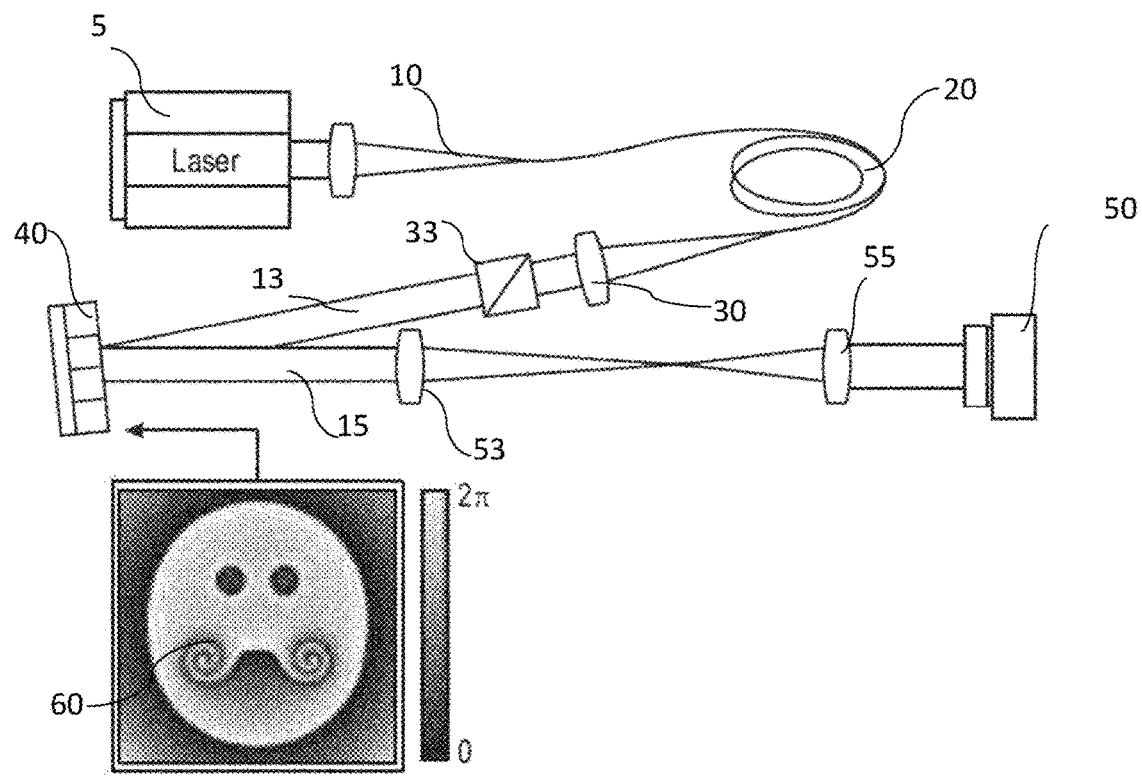
FIGS. 8a, 8b, and 8c is a schematic of one embodiment of a system according to the invention.
Figures 8B, 8C:
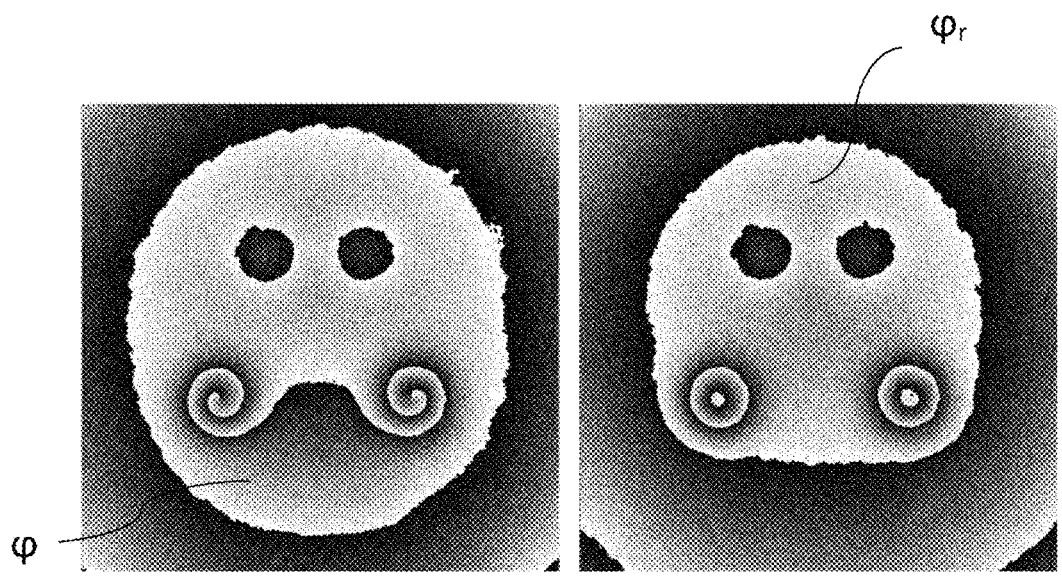

FIGS. 8a to 8c displays a further example of reconstructing a phase relying on the method of the present invention. In the embodied example, a light beam 10 generated by a laser 5 is spatially filtered through a single mode fiber (SMF) 20. The light beam 10 is then collimated by a lens 30 and polarized by a polarizing element 33. Here, a Polarizing beam splitter (PBS) 33 is used. The resulting spatially filtered and polarized laser beam 13 is then sent onto a phase-only spatial light modulator (SLM) 40.

A phase pattern 60, wrapped between 0 and $2\pi$ is then addressed to the SLM 40. As illustrated, the phase pattern 60 exhibits both smooth local lenses, for the eyes and the face contour for instance, as well as left- and right-handed optical vortices at the tips of the wiggling mustache. The resulting beam 15 contains thus a plurality of vortices V. The beam 15 is then imaged onto a WFS 50 with a 4-f Galileo telescope 53, 55.

FIG. 8b shows the phase rebuilt when neglecting the vortices. As illustrated, the rebuilt phase fails to reproduce a large part of the features of the phase pattern 60. This demonstrates the significant loss of information when vortices contribution is neglected, which, depending on the considered application, can lead to undesired effects and computation errors.

By contrast, in FIG. 8c the phase profile 60 addressed onto the SLM is rebuilt thanks to a Helmholtz decomposition of the phase gradient map recorded by the WFS, in a same way as described above. As shown, taking the divergence-free component into account allows the proper reconstruction of spiral phase profiles drawing the mustaches of the profile 60.

The invention is not limited to the described embodiments, and various variations and modifications may be made without departing from its scope.

For example, at step 109 the image processing method may comprise fitting the peaks P with bell-shaped functions, for example with Gaussian functions.

In this case, at step 111 one may compute the center of the bell-shaped functions and determine the location of the corresponding peaks P based on the center of the bell-shaped functions.

In step ii), the integral of the peak P may be then estimated by computing the area under the corresponding fitting bell-shaped curve.

In a variant, the image processing method may comprise solving an inverse problem to estimate the distribution of the peaks, by using tools such as a compressed sensing algorithm, a Markov Chain Monte Carlo Algorithm (MCMC) methods or neural networks.

According to a further embodiment, the image processing method may comprise identifying the extrema values of the Laplacian, notably using a threshold to ignore noise, wherein in step i) the location of the peaks is determined based on the location of the extrema.

In this case, in step ii), the integral of the peaks may be determined from the extrema magnitude only.

ADDITIONAL EXAMPLE OF INVENTION

In an embodiment, a method according to the present invention relies on the use of the Helmholtz's theorem, according to which the vector field g can be split into an irrotational (curl-free) component and a solenoidal (divergence-free) component.

All current integration techniques for WFS basically consists in computing $\nabla \cdot g$, so implicitly cancelling the solenoidal component of the vector field. When processing expectedly-smooth wavefront, the solenoidal term typically results from noise in low-intensity regions. However, ignoring optical vortices in wavefronts detected in the far field for instance is usually not possible. Neglecting a single optical vortex is then indeed equivalent to adding a complementary spiral phase mask which has been described as performing a two-dimensional Hilbert transform of the intensity pattern. For complex wavefields, such a single-spiral transform induces a major change in patterns since resulting in an inversion of intensity contrasts. The Helmholtz decomposition has been applied to many fields in physics, mostly in fluid mechanics. Optical phase vortices appearing in freely propagating beam have the specificity to be quantized and are multiples of 2π. Here, using a high resolution WFS described in EP 19305382, it has been demonstrated the possibility to rebuild complex wavefronts containing optical vortices.

The experimental system used is shown in FIG. 8a. A phaseonly spatial light modulator (SLM) (Hamamatsu, LCOS-X104 468-01), illuminated by a spatially filtered and polarized laser beam is imaged onto a high-resolution wavefront sensor (WFS).

A phase pattern, wrapped between 0 and 2π is then addressed to the SLM 50, (FIG. 8a) exhibiting both smooth local lenses (for the eyes and the face contour for instance) as well as left- and right-handed optical vortices at the tips of the wiggling mustache.

The Helmholtz decomposition of the phase-gradient vector-field measured by the WFS (FIG. 8c) according to:

$$g = \nabla \varphi_r + \nabla \times A$$

then allows splitting apart the contribution of a regular phase $\varphi_r$ and of a vector potential A. The sought-for phase profile $\varphi$, corresponding to the integral of g, is then $\varphi = \varphi_r + \varphi_s$, where the singular phase contribution $\varphi_s$, defined over a multiply-connected domain, satisfies $\nabla \varphi_p = \nabla \times A$. Noteworthy, the unicity of the Helmholtz decomposition both requires setting boundary conditions and taking into account the contribution of a so-called additional "harmonic" (or translation) term h, which is both curl-free and divergence-free. In practice, the translation term h, accounting for tilted wavefronts, may be included in the curl-free component $\nabla \varphi_r$, which it is achieved here thanks to symetrizations operations on the phase gradient map. Unicity of the solution is further ensured by implicit periodic boundary conditions applied by achieving derivation and integration computations through discrete Fourier transforms. The Helmholtz decomposition can typically be achieved by computing $\nabla \cdot g = \nabla \varphi_r$ and $\nabla \times g = \overline{\nabla}(\nabla \cdot A) - \Delta A$. A double spatial integration of $\nabla \cdot g$ allows retrieving $T_r$. Determining the potential vector A requires fixing gauge. The Coulomb gauge $\nabla \cdot A = 0$ is chosen here for obvious convenience.

Since g is a two-dimensional vector field (in say x, y plane), A can be written as $A = A_z e_z$. Then, Helmholtz decomposition can be achieved according to the scheme shown in FIG. 4.

Noticing that $gx + igy = (\partial x + i\partial y)(\varphi_r + iA_z)$, the Helmholtz decomposition may be conveniently achieved thanks to a single computation step by projecting vectors onto the circular unit vector $\sigma + = e_x + ie_y$:

$$\varphi_r - iA_z = F^{-1}\left\{\frac{F[g \cdot \sigma_+]}{ib\sigma_+}\right\}$$

where b stands for the two-dimensional coordinate vector in the reciprocal Fourier space. The regular phase component $\varphi_r$ can then be directly recovered in a similar was as usually performed (see FIG. 4). The divergence-free component may require further processing steps to get the phase with spirals $\varphi_s$ from the potential-vector component $A_z$.

Considering an optical vortex of topological charge n, by definition of the topological charge, the integral over a close contour surrounding the singularity is: $\oint g \cdot dl = 2\pi n$.

Applying the Stokes' theorem then yields $\int_s -\Delta A_z \cdot dS = 2\pi n$

Reducing the contour length to zero, it then appears that $-\Delta A_z / 2\pi n = \delta(r_\perp)$ is the Green function of the Laplace equation (see FIG. 4) making it easy to identify. Nevertheless, rebuilding the corresponding sought-for singular phase component φs is more difficult and no systematic procedure has ever been proposed. In principle, φs could be obtained by simply convoluting $-\Delta A_z / 2\pi n$ by a single +1 optical vortex.

However, in practice, the $-\Delta A_z$ map may not be a perfect Dirac distribution, or a single-pixeled non-zero data map, but may be affected by noise and more importantly, by filtering by the optical transfer function.

As detailed in (Berto, Pascal, Hervé Rigneault, and Marc Guillon. "*Wavefront sensing with a thin diffuser*." Optics Letters 42.24 (2017): 5117-5120), the optical transfer function may be dominated by the non-overlapping condition of WFS, which limits the maximum local value of the eigenvalues of the Jacobi matrix of g (i.e. the Hessian matrix of φ). As a first consequence, the curvatures of the phase component $φ_r$ (i.e. its second derivatives) are filtered. For an optical vortex, the magnitude of g diverges as 1/r at the vortex center, and so the Hessian coefficients $∂_x g_y$ and $∂_y g_x$. The vector potential $A_z$ is thus similarly filtered. An image processing step may thus be required to extract the location and the charge of optical vortices from the computed $ΔA_z$ map.

First, noise is removed by applying a Gaussian filter to $ΔA_z$ (FIG. 4), whose width is set according to a rough minimal estimate of the WFS resolution (10 camera-pixels here). The resulting image is then segmented using a watershed operation. Integration and weighted-centroid computation over each segmented regions yields the charge of each vortex. Finally, a Dirac-like vortex map is rebuilt according to the location and the charge of vortices, and convoluted by a +1 spiral phase mask to yield φs (see FIG. 4). The complete phase reconstruction φ=1φr+φs is then computed and wrapped between 0 and 2π (FIG. 4).

Figure 1:
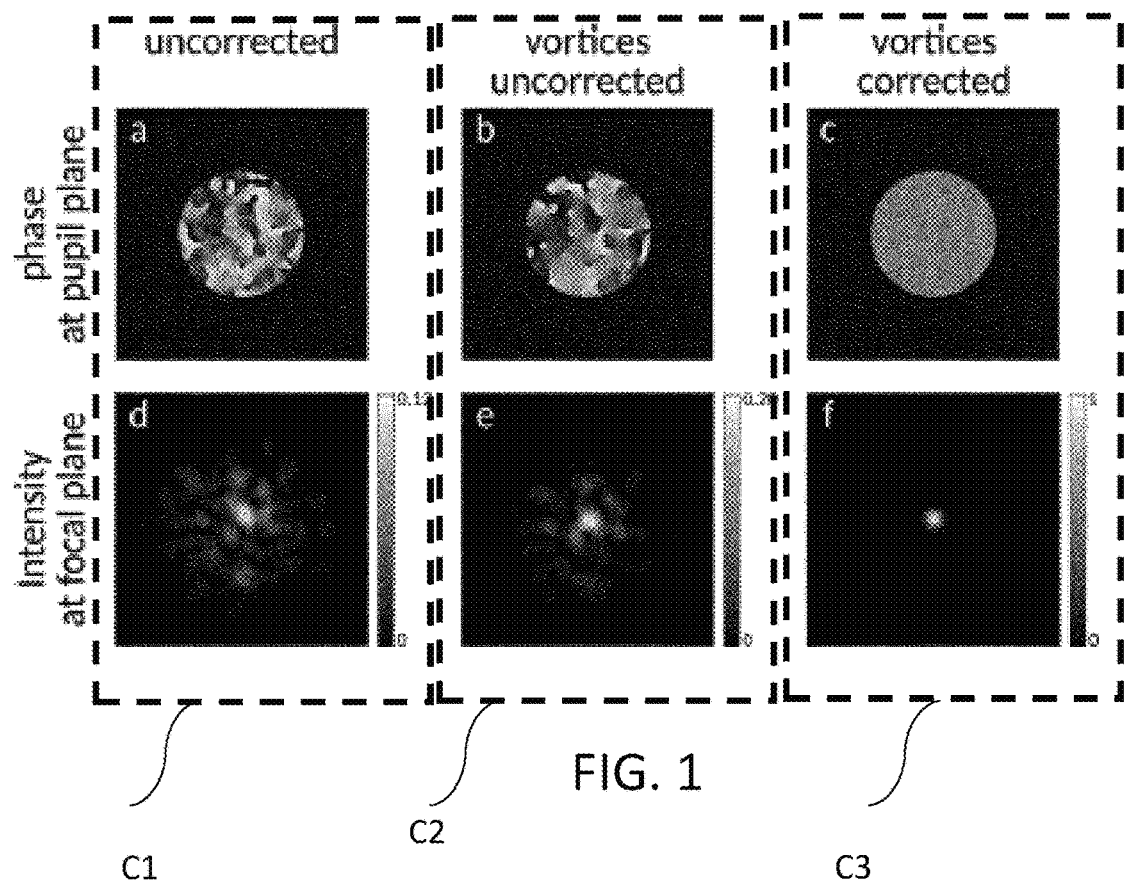
FIG. 1 previously described, illustrates the consequences of neglecting the divergence-free component in adaptive optics and in imaging, FIG. 2 previously described, illustrates the consequences of neglecting the divergence-free component in adaptive optics and in imaging.
Figure 2:
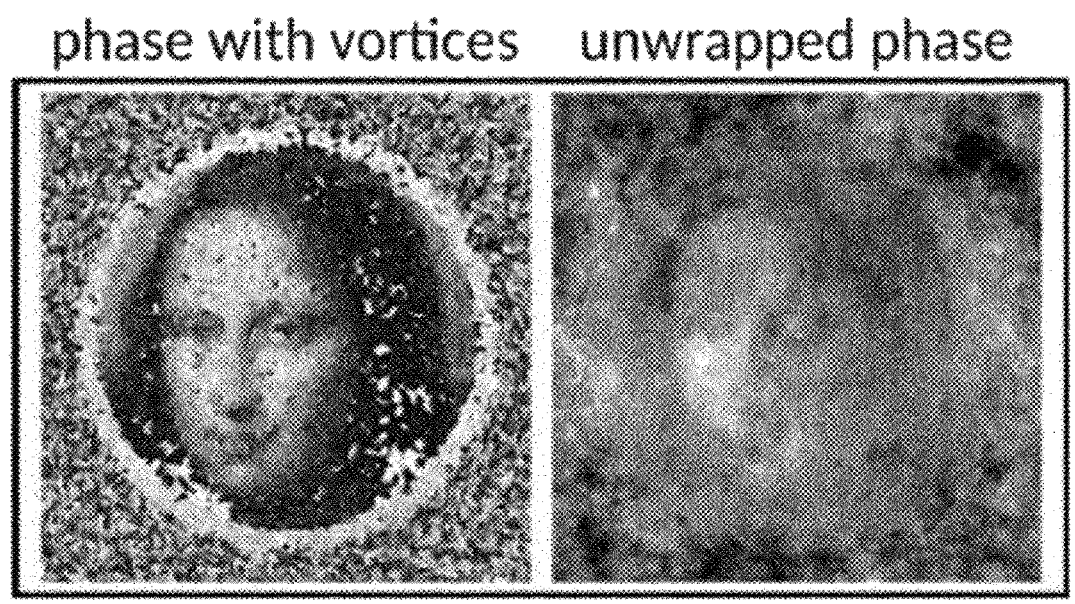
Figure 3:
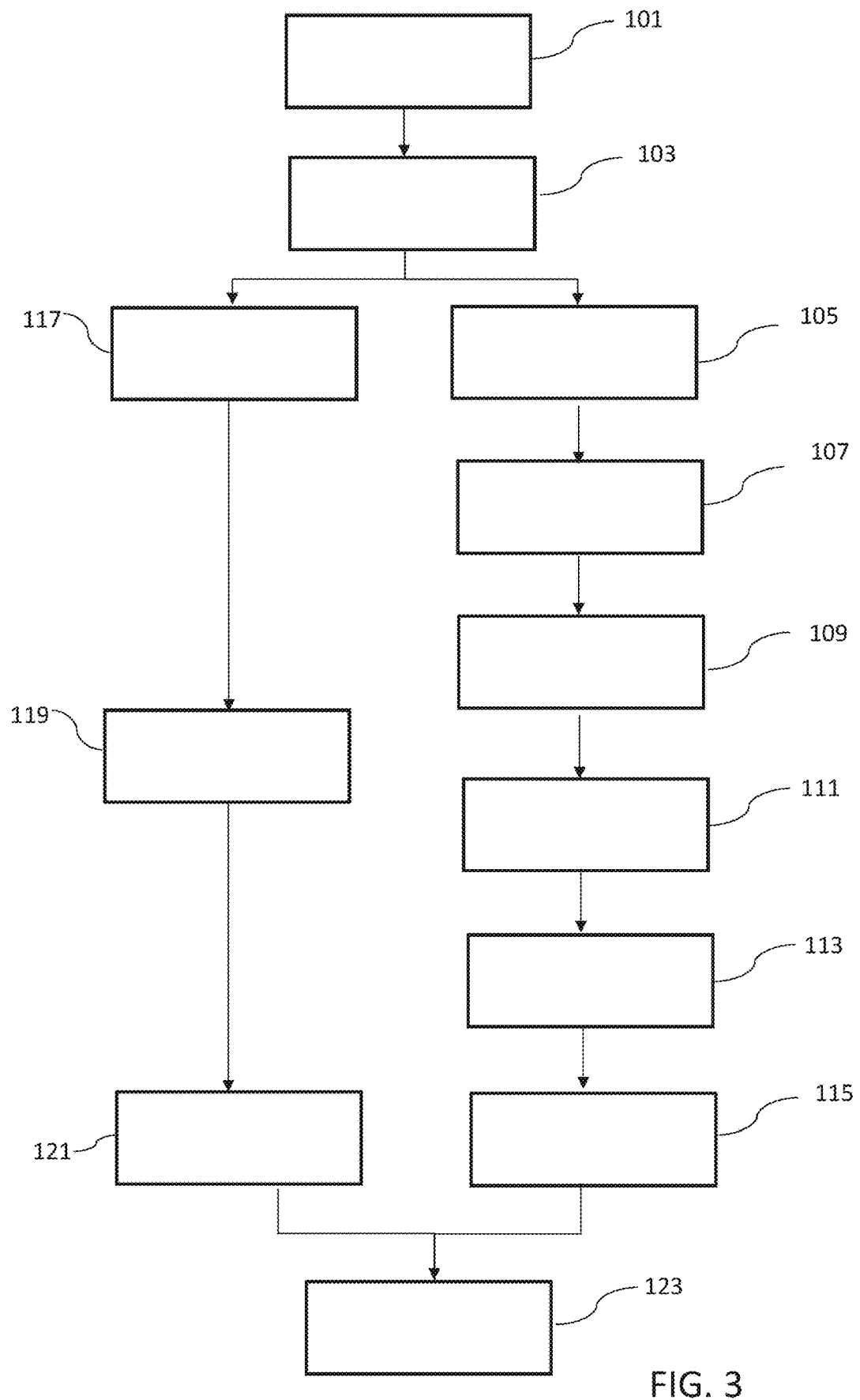
FIG. 3 is a schematic of one embodiment of a method according to the FIG. 4 is a schematic of one embodiment of a method according to the invention.

To demonstrate the possibility to rebuild optical vortices of charge larger than 1, a phase spirals from −10 to +10 (FIGS. 6a and 6b) is addressed. One specific difficulty in this case is the increasing gradient at the vortex location, leading to an increased filtering by the optical transfer function of the WFS. As a first consequence, the ΔA z maps exhibit peaks whose width increases with the charge of the vortex n (FIG. 6a). Nevertheless, integration of $-ΔA_z/(2π)$ over segmented regions yields n with a 3% accuracy which it may attributed to the calibration uncertainties of the SLM and WFS (FIG. 6b). Rounding the integrated value to the closest integer allowed proper reconstruction of the optical vortices (FIG. 3a). Differences of rebuilt phase profiles with perfect ones addressed to the SLM is due to the noisy contribution of the regular phase φr. In principle, φr should be perfectly flat but imperfections of the SLM and in the imaging system leads to wavefront distortions.

The possibility to retrieve the phase of complex random wavefields is demonstrated. Random wavefields exhibit a high density of optical vortices of charge +1 and −1. These vortices exhibit elliptical phase and intensity profiles along the azimuthal coordinate which may alter the ability to detect them.

Figure 7D:
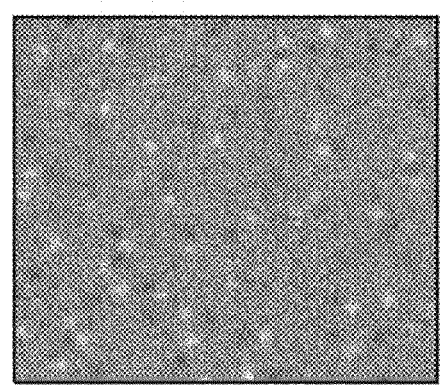

Furthermore, their separation distances may be much smaller than the speckle grain size, especially when close to creation or anihilation events of pairs of vortices. Despite these specific additional difficulties, such a complex wavefields addressed to the SLM (FIG. 7a) could be efficiently rebuilt (FIG. 7b). Some of the 0-2π equiphase lines of the input phase are materialized. These equiphase lines are easy to identify because of the abrupt black to-white drop. The difference between the rebuilt and the input phase profiles is shown in FIG. 7c demonstrating the almost perfect identification of optical vortices. Differences mostly appear on the φr contribution on the edges of the SLM, where the SLM reliability degrades. The dense experimental map of vortices distribution and charges is shown in FIG. 7d.

The invention claimed is:

1. A method for reconstructing the wavefront of a light beam by analyzing wavefront-gradient data of said light beam, the light beam containing at least one optical vortex (V), considering the contribution of the optical vortices (V) to the wavefront, the method comprising:
   a) providing a phase-gradient map g of the wavefront of the light beam,
   b) generating a Laplacian of a vector potential based on the phase gradient map g, the resulting Laplacian of the vector potential map $(-ΔA_z)$, called "Laplacian map", exhibiting peaks (P), the Laplacian map being obtained by applying a curl operator to the phase-gradient map g,
   the location of each peak (P) corresponding to the location (u) of an optical vortex (V) and the integral of the peak being proportional to a topological charge n of said optical vortex (V),
   c) applying an image processing method to the Laplacian map to extract the location (u) and the charge n of optical vortices, the image processing method comprising a segmentation of the Laplacian map into a plurality of segments (Ω) to obtain a segmented Laplacian map, segments (Ω) being determined so that different peaks of the Laplacian map belong to different segments;
   d) for these different segments (Ω) of the segmented Laplacian map $(-ΔA_z)$:
      i) determining the location (u) of the corresponding peak (P) in the segment (Ω) of the Laplacian map $(-ΔA_z)$ to locate the corresponding optical vortex (V),
      ii) computing an approximate value of the integral of the corresponding peak (P) over the segment (Ω), and determining the topological charge n of the corresponding vortex (V) based on said approximate value of the integral of said peak (P);
   e) computing a singular phase map $φ_s$ based on the topological charge n and location (u) of each optical vortex (V) computed in steps i) and ii),
   the singular phase φs map being representative of the contribution of the optical vortex and being computed by:
      iii) generating a vortex-location map, where map values are equal to the corresponding topological charges n of optical vortices at optical vortices locations (u), and
      iv) convoluting said vortex-location map with a single +1 spiral phase profile;
   f) reconstructing the wavefront of the light beam with:
      computing a regular phase $φ_R$ map of the light beam, the regular phase corresponding to a vortex-free phase computed from the irrotational component,
      adding the regular phase $φ_R$ to the singular phase $φ_s$ to obtain the said reconstructed wavefront of the light beam.

2. The method according to claim 1, wherein in step ii) the topological charge n of an optical vortex is obtained by:
   dividing the approximate value of the integral of the corresponding peak by 2kπ, with k an integer
   rounding the result of the former operation to the closest integer to get the topological charge n.

3. The method according to claim 2, wherein the integer k is equal to −1 or +1.

4. The method according to claim 1, wherein the segmentation at step c) is realized with a numerical tool among the list: the watershed algorithm, the normalized cut algorithm, the SLIC algorithm, or convolutional neuronal networks, and/or a deep learning algorithm.

5. The method according to claim 1, step i) comprising computing the weighted centroid of each peak (P) in each segment (Ω) corresponding to said peak, determining the location (u) of the said peak based on the weighted centroid.

6. The method according to claim 1, wherein in step c) the image processing method comprises fitting the peaks (P) with bell-shaped functions, for example with Gaussian functions.

7. The method according to claim 6, wherein in step ii), the integral of the peak is estimated by computing the area under the corresponding fitting bell-shaped curve.

8. The method according to claim 1, wherein in step c) the image processing method comprising solving an inverse problem to estimate the distribution of the peaks (P), by using tools such as a compressed sensing algorithm, a Markov Chain Monte Carlo Algorithm (MCMC) methods or neuronal networks.

9. The method according to claim 1, the image processing method comprising identifying the extrema values of the Laplacian, notably using a threshold to ignore noise, wherein in step i) the location of the peaks is determined based on the location of the extrema.

10. The method according to claim 1, wherein in step ii) the integral of the peaks is determined from the extrema magnitude only.

11. The method according to claim 1, wherein the convolution in step e)iv) to obtain the singular phase $\varphi_s$ is: achieved numerically by adding as many spiral phase profiles as the number of detected optical vortices, each spiral phase profile being centered at the same location and having the same topological charge as the detected optical vortices (V).

12. The method according to claim 1, wherein in the step f), the regular phase $\varphi_R$ map is computed by applying a divergence operator to the phase gradient map g, followed by a double spatial integration.

13. The method according to claim 1, wherein the phase-gradient g is decomposed according to Helmholtz decomposition as follows: $g=\nabla\varphi_r+\nabla\times A$ where φr is the regular phase, the gradient ∇φr corresponding to the irrotational component of g and where A is the potential vector corresponding to the solenoidal component of g.

14. A computer-readable storage medium comprising instructions which, when executed by a computer, causes the computer to carry out the steps of the method according to claim 1.

15. A device for reconstructing the wavefront of a light beam by analyzing wavefront-gradient data of the light beam, the light beam containing at least one optical vortex (V), in order to estimate the contribution of the optical vortices (V) to the wavefront, comprising:
a wavefront sensor to measure the phase-gradient of the wavefront of the light beam;
coupled to the wavefront sensor, means for carrying out the steps of the method of claim 1, some calculating means comprising a memory storage unit, a set of instructions and a processor for executing said set of instructions,
these instructions being:
a) providing a phase-gradient map g of the wavefront of the light beam;
b) generating a Laplacian of a vector potential based on the phase gradient map g, the resulting Laplacian of the vector potential map ($-\Delta A_z$), called "Laplacian map", exhibiting peaks (P), the Laplacian map being obtained by applying a curl operator to the phase-gradient map g,
the location of each peak (P) corresponding to the location (u) of an optical vortex (V) and the integral of the peak being proportional to a topological charge n of said optical vortex (V);
c) applying an image processing method to the Laplacian map to extract the location (u) and the charge n of optical vortices, the image processing method comprising a segmentation of the Laplacian map into a plurality of segments (Ω) to obtain a segmented Laplacian map, segments (Ω) being determined so that different segments contain different peaks of the Laplacian map;
d) for these different segments (Ω) of the segmented Laplacian map ($-\Delta A_z$):
i) determining the location (u) of the corresponding peak (P) in the segment (Ω) of the Laplacian map ($-\Delta A_z$) to locate the corresponding optical vortex (V),
ii) computing an approximate value of the integral of the corresponding peak (P) over the segment (Ω), and determining the topological charge n of the corresponding vortex (V) based on the said approximate value of the integral of the said peak (P);
e) computing a singular phase map $\varphi_s$ based on the topological charge n and location (u) of each optical vortex (V) computed in steps i) and ii),
the singular phase $\varphi_s$ map being representative of the contribution of the optical vortex and being computed by:
iii) generating a vortex-location map, where map values are equal to the corresponding topological charges n of optical vortices at optical vortices locations (u), and
iv) convoluting said vortex-location map with a single +1 spiral phase profile;
f) reconstructing the wavefront of the light beam with:
computing a regular phase $\varphi_R$ map of the light beam, the regular phase corresponding to a vortex-free phase computed from the irrotational component,
adding the regular phase $\varphi_R$ to the singular phase $\varphi_s$ to obtain the said reconstructed wavefront of the light beam.

16. The device according to claim 15, configured to reconstruct the wavefront of the light beam, by calculating the regular phase $\varphi_R$ which is added to the singular phase φs.

17. The device according to claim 15, wherein the calculating means are configured to:
pre-compensate the aberrations or
compensate a posteriori the aberrations,
of the wavefront of the light beam which result of the emission sources and of the properties of the materials the light beam travels across.

18. The device according to claim 15, wherein the wavefront sensor is chosen among the list:
Shack-Hartmann wavefront sensor
Multi-wave interferometer such as Quadri-wave lateral shearing interferometer;
Pyramid Wavefront sensor.

* * * * *